United States Patent [19]

Loyd

[11] Patent Number: 4,867,623
[45] Date of Patent: Sep. 19, 1989

[54] RING FITTING FOR DUNNAGE TRACK

[75] Inventor: Bruce L. Loyd, Lawrence, Kans.

[73] Assignee: Aeroquip Corporation, Jackson, Mich.

[21] Appl. No.: 308,748

[22] Filed: Feb. 10, 1989

[51] Int. Cl.[4] .................... B61D 45/00; B65D 63/00; B60P 7/08
[52] U.S. Cl. ..................................... 410/105; 248/500
[58] Field of Search ................ 410/104, 105, 116, 77; 244/118.1; 248/500, 503, 503.1

[56] References Cited

U.S. PATENT DOCUMENTS

| | | | |
|---|---|---|---|
| 2,743,684 | 5/1956 | Elsner | 410/105 |
| 2,891,490 | 6/1959 | Elsner | 410/105 |
| 3,263,629 | 8/1966 | Higuchi | 410/105 |
| 3,282,229 | 11/1966 | Elsner | 410/105 |
| 3,601,349 | 8/1971 | Murphy, Jr. | 410/104 |
| 3,605,637 | 9/1971 | Prete, Jr. | 410/105 |
| 3,677,195 | 7/1972 | Prete, Jr. | 410/105 |
| 3,713,616 | 1/1973 | Bowers | 410/105 |
| 4,047,689 | 9/1977 | Grendahl | 410/105 |
| 4,062,298 | 12/1977 | Weik | 410/105 |
| 4,085,684 | 4/1978 | McLennan et al. | 410/105 |
| 4,109,891 | 8/1978 | Grendahl | 410/105 X |
| 4,230,432 | 10/1980 | Howell | 410/105 X |
| 4,256,424 | 3/1981 | Knox et al. | 410/105 |
| 4,396,175 | 8/1983 | Long et al. | 410/105 X |
| 4,496,271 | 1/1985 | Spinosa et al. | 410/105 |
| 4,509,888 | 4/1985 | Sheek | 410/105 |
| 4,708,549 | 11/1987 | Jensen | 410/105 |
| 4,796,837 | 1/1989 | Dowd | 410/105 X |

Primary Examiner—Douglas C. Butler
Attorney, Agent, or Firm—Beaman & Beaman

[57] ABSTRACT

An anchor fitting for attachment to a track member including a plurality of rectangular slots, wherein the fitting has a body constructed of a plurality of stamped plates fastened together by rivets. One end of the body has a notch defined thereon for receiving the track member and the other end includes an elongated ledge engaging the track inner side. A keeper is pivotally mounted adjacent the ledge end receivable within the slot to increase the body length within the slot to retain the fitting. A hole is formed in the body through which a ring is passed wherein straps or other tensioning device for securing cargo may be attached.

8 Claims, 1 Drawing Sheet

RING FITTING FOR DUNNAGE TRACK

BACKGROUND OF THE INVENTION

In the transportation of cargo and people by aircraft, semitrailer, railroad, bus, van, and the like, it is necessary that the cargo be prevented from shifting or moving to prevent damage to the cargo as well as to the transportation vehicle itself. These requirements are commonly met by providing a number of track members which are attached to the floor or walls of cargo compartments of such transportation vehicles. These tracks often have a plurality of slots to receive a fitting which is used for securing cargo. Typical fittings for attachment to these types of tracks include retaining means to selectively lock the fitting to the track and a ring or similar device is used to permit a strap or other tensioning means to be attached to the fitting.

Fittings of the aforedescribed type should be easy to operate, readily manufacturable, dependable in operation and able to withstand relatively large tension forces imposed on the fitting from a variety of directions without bending or deforming the fitting. Previously, a fitting incorporating all of the aforementioned features into one simple construction and being of low manufacturing cost has not been available for use.

It is an object of the invention to provide a fitting of the cargo securing type to be employed with a track member wherein the body of the fitting is constructed from a plurality of identical stamped plates fastened together to form a high strength fitting of low manufacturing cost.

It is another object of the invention to provide a fitting to be employed with a track member wherein the fitting has positive pivotal retainer means that may be easily operated for locking and unlocking the fitting relative to the track.

It is a further object of the invention to provide a fitting adapted to be employed with a track wherein a retainer defined on the fitting includes locking structure that will withstand high forces imposed on the fitting to prevent premature unlocking of the retainer.

In the practice of the invention the fitting has a main body formed of three identical stamped plates fastened together by rivets. The body is adapted to be employed with a track member including a plurality of rectangular slots. The body has a width slightly less than the width of the associated slot, a notch defined on one end and an elongated ledge portion extending from the other end adapted to be received within the slot. A spring biased keeper is pivotally mounted adjacent the ledge end movable between operative and inoperative positions normally biased to the operative position where it is alignable with the slot when the body is located within the slot. The body also includes a hole through which a ring is passed for attaching a strap, or the like, thereto.

To assemble the fitting to the track the keeper is pivoted to the inoperative position and the ledge portion of the fitting is inserted through the slot opening. Upon the ledge being fully received within the slot adjacent the underside of the track at a slot en moving the body in the direction of the notch end will locate the track member in the notch while the ledge of the fitting remains adjacent the track underside and the closing of the keeper to the operative position adjacent the ledge within the slot limits sliding movement of the body in the slot to retain the fitting within the slot. To remove the fitting from the track member slot, the keeper is pivoted to the release position and the body is moved in the direction of the ledge which withdraws the track slot edge from the notch and permits the fitting body notch end to be lifted from the slot and the entire fitting body may then be removed from the slot.

The simple construction of the stamped plates provide for low manufacturing cost and high strength. The fitting is also capable of withstanding heavy loading forces without distortion or damage regardless of the direction of such forces imposed upon the fitting.

BRIEF DESCRIPTION OF THE DRAWINGS

The aforementioned objects and advantages of the invention will be appreciated from the following description and accompanying drawings wherein.

Figure 1:
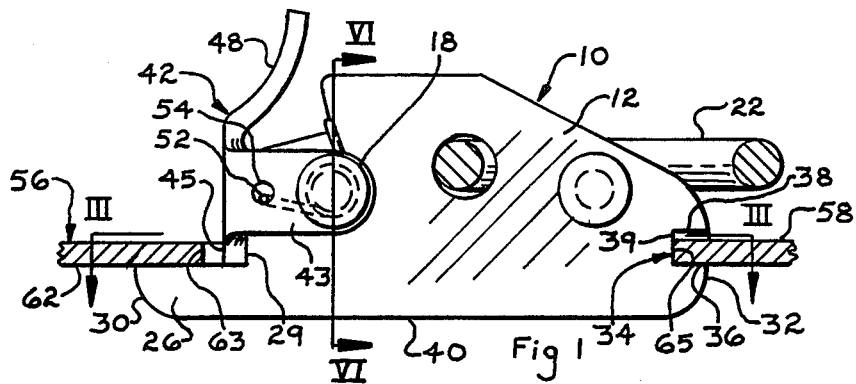
FIG. 1 is an elevational side view of a ring fitting in accord with the invention assembled to a track illustrating the keeper in the operative position.

DESCRIPTION OF THE PREFERRED EMBODIMENTS.

A typical fitting in accord with the invention is disclosed in FIGS. 1-6. The ring fitting 10 has a body 12 constructed of three identical stamped plates 14 fastened together by rivets 16 and 18. The rivet 18 also functions as a pivot for a keeper used for locking the fitting 10 into a rectangular slot of a track member. Hole 20 is transversely formed in the body 12 through which a ring 22 is received. A conventional cargo tiedown strap or other tensioning member, not shown, may be attached to the ring 22 for securing a load, not shown.

The body 12 has a given width defined by the side walls 24. An elongated ledge 26 having a flat abutment surface 28 is formed at one end of the body 12 adjacent a front edge 29 and has a curved edge 30 adjacent the surface 28. The other end 32 of the body has a notch 34 defined thereon. The notch 34 has opposed lateral sides having edges 36 and 38 separated by a predetermined distance for receiving the track member and an end 39. The lower notch edge 36 forms a ledge and is the same distance as is the ledge surface 28 is from the bottom edge 40 of the body 12 and the length of the ledge 26 is greater than the length of the notch edges 36 and 38.

A keeper 42 having arms 43 is pivotally mounted upon the body 12 adjacent the ledge 26 by the rivet 18 passed through holes 44 defined in the arms. The keeper 42 also consists of a tongue portion 45 having a thickness defined by the sides 46 and a handle 48 for facilitating manual operation of the keeper. The keeper 42 is movable between operative and inoperative positions and is normally biased to the operative position by a torsion spring 50, where the tongue portion 45 engages the ledge surface 28 as shown in FIG. 1 The spring 50 is coiled about the rivet 18 and has ends 52 received in holes 54 defined in the keeper arms 43.

The fitting 10 of the invention is intended to be employed with a conventional track member having a plurality of rectangular slots wherein the fitting is selectively attached to one of the slots. This type of track is known and shown in FIGS. 1-3. The track member 56 has a flat outer surface 58, an inner under side 62 and a rectangular slot 60 defined by parallel sides 61 and ends 63 and 65. The slot 60 has a width defined by sides 61 slightly greater than the width of the body 12 as formed by sides 24. The thickness of the track 56 as defined by sides 58 and 62 is less than the height of the notch 34 as defined by edges 36 and 38. The distance between edge 29 and end 32 is less than the distance separating slot ends 63 and 65 and the length of ledge 26 is greater than the length of notch edge 36, but the body length from end 30 to end 32 is greater than the slot length.

Figure 2:
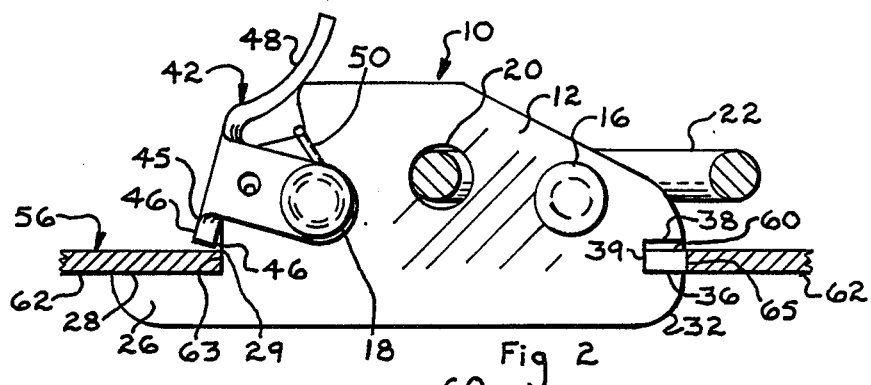
FIG. 2 is an elevational view of a ring fitting in accord with the invention illustrating the keeper in th inoperative or release position.
Figure 3:
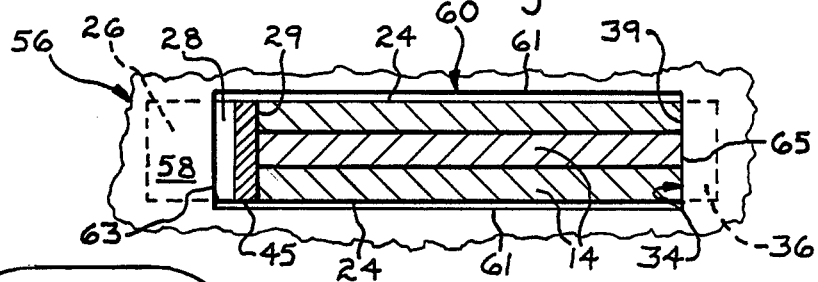
FIG. 3 is a plan, sectional view, taken along section III—III of FIG. 1.
Figure 5:
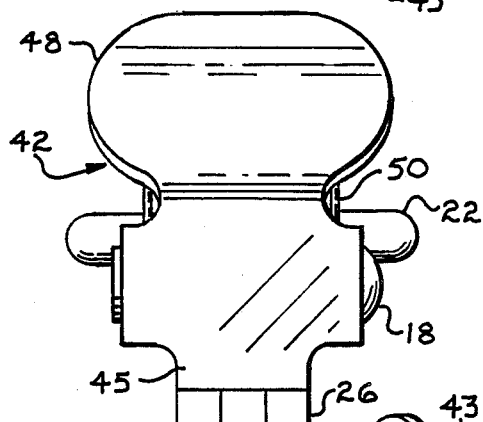
FIG. 5 is a front elevational view of the fitting as taken from the left of FIG. 1, the track member being omitted for purpose of illustration.
Figure 6:
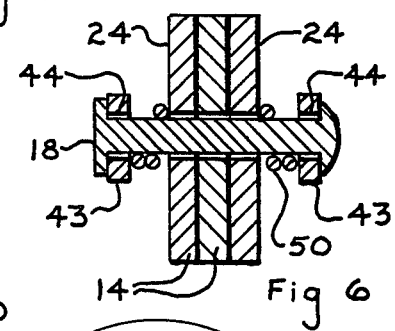
FIG. 6 is an elevational, sectional view, taken along section VI—VI of FIG. 1.
Figure 4:
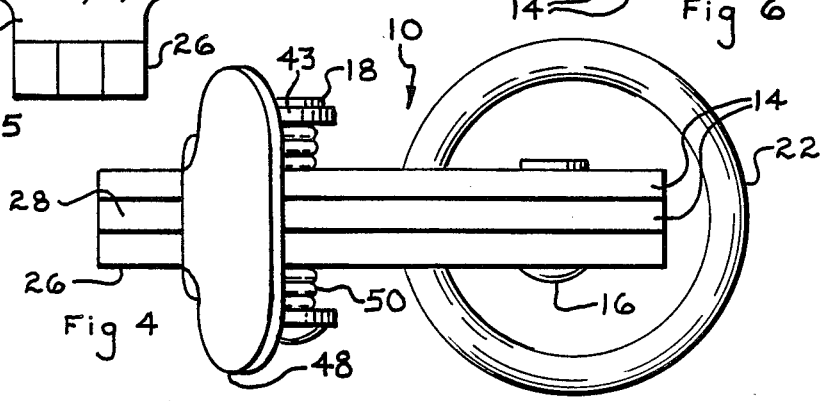
FIG. 4 is a top view of FIG. 1.

To assemble the ring fitting 10 to the track the keeper 42 is pivoted to the inoperative position as shown in FIG. 2 and the elongated ledge 26 is inserted through the slot 60 and locate under end 63. By sliding the body 12 forward the ledge 26 moves further under end 63 until the front edge 29 of the body 12 engages the track slot end 63 and the end 32 of the body 12 is then lowered into the slot 60 as shown in FIG. 2. Upon sliding the body 12 backwards in the slot 60 the notch 34 will receive the track member 56 as the lower notch edge 36 is located under side 62 and the body 12 is moved to the right, FIG. 2, until edge 39 engages slot end 65 as shown in FIG. 1. The ledge 26 remains "under" side 62 and the keeper 42 is permitted to pivot to the operative position engaging the tongue 45 with the ledge surface 28 and locate the tongue within the slot 60. The thickness of the tongue 45 is sufficient to limit longitudinal sliding movement of the fitting 10 in the slot 60 so that the track end 65 will remain in the notch 34 even if the slot end 63 is engaged by the tongue. The fitting body 12 will not "fall" through the slot as the notch edge 38 engages track surface 58 as do the lower edges of the arms 43.

The configuration of the body 12 is such that it closely fits the slot 60 restraining twisting or sideways movement of the fitting 10 by transverse forces imposed upon the fitting 10 through the ring 22. The body hole 20 is large enough to allow free movement of the ring 22 in angular directions whereby the ring aligns with imposed tension forces minimizing the bending forces imposed upon the fitting 10 through the ring 22 preventing deformation of the body 12.

Upon the fitting 10 being employed with the track 56 in the retained position as shown in FIG. 1, the keeper 42 remains in the operative position by the action of the spring 50 which is independent of forces imposed upon the fitting to assure retention of the fitting within the track slot.

To remove the fitting 10 from the track it is merely necessary to pivot the keeper 42 to the inoperative position, FIG. 2, and slide the fitting 10 to a forward position to the left engaging edge 29 with slot end 63 so that end 32 clears slot end 65 and pulling the fitting end 32 in an upward direction withdraws the ledge 26 from the slot 60 and separates the fitting from the track member 56.

It is appreciated that various modifications to the inventive concepts may be apparent to those skilled in the art without departing from the spirit and scope of the invention.

I claim:

1. A fitting for attachment to a track member having inner and outer surfaces and a rectangular slot having sides and first and second ends, said fitting comprising, in combination, a body having a width slightly less than the width of the track members, slot and an overall body length defined by the ends that is greater than the slot length and including first and second longitudinally extending ledges, said first ledge being defined in one end of said body, said second ledge being defined in the other end of said body and being shorter in length than the length of said first ledge, a first abutment defined o said body adjacent said first ledge and a second abutment defined on said body adjacent said second ledge, the longitudinal distance between said abutments being less than the length of the slot, a keeper movably mounted on said body movable between retaining and release positions, said keeper defining a third abutment and located adjacent said first abutment, the distance between said third abutment and said second abutment being greater than the length of the slot whereby when said keeper is in said release position said body may be inserted within and removed from the slot and when said body is within the slot and said keeper is in said retaining position and said second and third abutments are located within said slot and said ledges are adjacent the track member inner surface said body cannot be removed from said slot, and load attachment means defined on said body.

2. In a fitting for attachment to a track member as in claim 1, said body comprising at least two similar stamped plates riveted together.

3. In a fitting for attachment to a track member as in claim 1, said keeper being pivotally mounted adjacent said first ledge, said keeper when received within said slot limiting longitudinal movement of said body within said slot and maintaining said ledges adjacent the track member inner surface.

4. A fitting for attachment to a track member having inner and outer surfaces including a rectangular slot having sides and first and second ends comprising, in combination, a body having a width slightly less than the width of the track member slot and first and second ends, a notch defined in one end of said body having lateral sides separated a distance slightly greater than the thickness of the track member as defined by the track surfaces, an elongated ledge extending from the other end of said body, said elongated ledge having a length greater than the depth of said notch, said body having a length less than the length of the slot and the combined length of said body and ledge being greater than the length of the slot, retainer means mounted adjacent said ledge selectively movable between operative and inoperative positions and receivable within the slot in said operative position limiting movement of said body in the slot, load attachment means defined on said body, said retainer means when in the inoperative position permitting said ledge to be inserted within the slot and under the slot first end and said notch to be aligned with the slot second end whereby longitudinal displacement of said body locates said notch upon the slot second end and said ledge remains opposed to the track member inner surface and said keeper when in said operative position prevents removal of the slot second end from said notch.

5. In a fitting for attachment to a track member as in claim 4, said retainer means comprising a keeper pivotally mounted on said body adjacent said ledge having a tongue received in said slot engaging said ledge in said operative position.

6. In a fitting for attachment to a track member as in claim 5, said keeper including spring means maintaining said keeper in said operative position.

7. In a fitting for attachment to a track member as in claim 4, said body comprising at least two similar stamped plates riveted together, a portion of said ledge homogeneously extending from each of said plates.

8. In a fitting for attachment to a track member as in claim 4, said load attachment means comprising a hole in said body, and a ring member received within said hole.

* * * * *